(12) United States Patent
Golm et al.

(10) Patent No.: US 11,046,286 B2
(45) Date of Patent: Jun. 29, 2021

(54) METHODS AND SYSTEMS TO IMPROVE CHILD RESTRAINT INSTALLATION DETECTION

(71) Applicant: GM GLOBAL TECHNOLOGY OPERATIONS LLC, Detroit, MI (US)

(72) Inventors: Erik B. Golm, Warren, MI (US); Tito R. Huffman, East Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/506,319

(22) Filed: Jul. 9, 2019

(65) Prior Publication Data
US 2021/0009077 A1   Jan. 14, 2021

(51) Int. Cl.
*B60R 22/48* (2006.01)
*B60N 2/28* (2006.01)

(52) U.S. Cl.
CPC .......... *B60R 22/48* (2013.01); *B60N 2/2887* (2013.01); *B60R 2022/4808* (2013.01); *B60R 2022/4866* (2013.01)

(58) Field of Classification Search
CPC .... B60N 2/2806; B60N 2/002; B60N 2/2863; B60N 2/2887; B60N 2/286; B60N 2/2821; B60N 2/2812; B60R 22/48; B60R 22/105; B60R 2022/4808; B60R 2022/4866
See application file for complete search history.

(56) References Cited

U.S. PATENT DOCUMENTS

| | | | |
|---|---|---|---|
| 2015/0091348 A1* | 4/2015 | Juchniewicz | B60N 2/2887 297/256.16 |
| 2016/0304004 A1* | 10/2016 | Sandbothe | B60N 2/2851 |
| 2017/0240111 A1* | 8/2017 | Appukutty | B60Q 9/00 |
| 2018/0015841 A1* | 1/2018 | Borgne | B60N 2/002 |

* cited by examiner

*Primary Examiner* — Orlando Bousono
(74) *Attorney, Agent, or Firm* — Quinn IP Law (57) ABSTRACT

An automotive vehicle includes a body having a passenger compartment, an anchorage system for securing a child restraint disposed in the passenger compartment, the anchorage system including a latchable bar member, a child restraint installation system coupled to the anchorage system, the child restraint installation system including a trigger member, a sensor contact member, a compression member, a retaining member, and a sensor, and at least one controller in communication with the sensor, the at least one controller being configured to, in response to satisfaction of a first operating condition, generate a first notification signal and, in response to satisfaction of a second operating condition, generate a second notification signal.

12 Claims, 9 Drawing Sheets

METHODS AND SYSTEMS TO IMPROVE CHILD RESTRAINT INSTALLATION DETECTION

INTRODUCTION

The present disclosure relates generally to sensors for vehicle anchorage systems for installation of a child restraint in a vehicle.

The main reason children get injured in child restraints is because the child restraint is not installed correctly. Methods and systems to reduce the human error involved with tightening a car restraint to the vehicle using, for example, the LATCH (lower anchor and tethers for children) system, would reduce injuries and also provide information to an autonomous vehicle driving system that a child restraint has been installed.

SUMMARY

Embodiments according to the present disclosure provide a number of advantages. For example, embodiments according to the present disclosure provide methods and systems to assist the installer of a child car restraint to securely fasten the child restraint to the vehicle using, for example and without limitation, the LATCH system of the vehicle.

An automotive vehicle according to an embodiment of the present disclosure includes a body having a passenger compartment, an anchorage system for securing a child restraint disposed in the passenger compartment, the anchorage system including a latchable bar member, and a child restraint installation system coupled to the anchorage system. The child restraint installation system includes a trigger member, a sensor contact member coupled to the anchorage system, a retaining member coupled to the trigger member, and a sensor coupled to the retaining member and movable relative to the sensor contact member. The automotive vehicle also includes at least one controller in communication with the sensor, the at least one controller being configured to, in response to satisfaction of a first operating condition, generate a first notification signal and, in response to satisfaction of a second operating condition, generate a second notification signal.

In exemplary embodiments, the automotive vehicle further includes a child restraint latch mechanism coupled to the child restraint disposed in the passenger compartment, the child restraint latch mechanism including a hook coupled to a tensionable strap.

In exemplary embodiments, the trigger member includes a trigger latch portion and the latchable bar member includes a latchable portion. The trigger latch portion and the latchable portion of the latchable bar member releasably engage with the hook of the child restraint latch mechanism.

In exemplary embodiments, the sensor contact member includes an opening configured to receive a portion of the trigger member such that the trigger member slidably engages with the sensor contact member.

In exemplary embodiments, the sensor contact member includes a sensor contact surface configured to engage with the sensor.

In exemplary embodiments, the child restraint installation system further includes a compression member and the retaining member is coupled to a terminal end of the trigger member. The compression member encircles a portion of the trigger member and is disposed between the retaining member and the sensor contact member.

In exemplary embodiments, the retaining member includes an opening configured to receive the sensor, the sensor is configured to move with the retaining member relative to the sensor contact member such that a terminal end of the sensor is in contact with the sensor contact surface under the first operating condition and the terminal end of the sensor is not in contact with the sensor contact surface under the second operating condition.

In exemplary embodiments, the anchorage system includes a rear seat belt mounting bar and the latchable bar member and the sensor contact member are coupled to the rear seat belt mounting bar.

In exemplary embodiments, the child restraint installation system further includes a light source configured to illuminate in response to satisfaction of either or both of the first and second operating conditions.

In exemplary embodiments, the automotive vehicle further includes an information system in communication with the at least one controller and the information system is configured to convey information to a vehicle passenger regarding one or both of the first and second operating conditions.

A child restraint installation system for a vehicle according to an embodiment of the present disclosure includes a sensor contact member including a sensor contact surface, a sensor, and a retaining member including an opening configured to receive the sensor, wherein the sensor is configured to move with the retaining member relative to the sensor contact member. The system also includes at least one controller in communication with the sensor, the at least one controller being configured to, in response to a terminal end of the sensor being in contact with the sensor contact surface, generate a first notification signal and, in response to the terminal end of the sensor being not in contact with the sensor contact surface, generate a second notification signal.

In exemplary embodiments, the child restraint installation system further includes a trigger member and a compression member. The retaining member is coupled to a terminal end of the trigger member and the compression member encircles a portion of the trigger member and is disposed between the retaining member and the sensor contact member.

In exemplary embodiments, the sensor contact member includes an opening configured to receive a portion of the trigger member such that the sensor contact member slidably engages with the trigger member.

In exemplary embodiments, the child restraint installation system further includes a light source in communication with the sensor and configured to illuminate in response to contact between the sensor and the sensor contact surface and loss of contact between the sensor and the sensor contact surface.

In exemplary embodiments, the trigger member includes a first leg and a second leg connected by a trigger latch portion, the sensor contact member includes a first opening configured to receive the first leg of the trigger member and a second opening configured to receive the second leg of the trigger member, and the retaining member is coupled to a terminal end of the first leg and a terminal end of the second leg of the trigger member.

In exemplary embodiments, the compression member includes a first compression member encircling a portion of the first leg of the trigger member and a second compression member encircling a portion of the second leg of the trigger member and each of the first and second compression members are disposed between the retaining member and the sensor contact member.

In an exemplary embodiment of the present disclosure, a method to improve child restraint installation detection includes providing an automotive vehicle having a body enclosing a passenger compartment and a controller, the passenger compartment including an anchorage system for securing a child restraint disposed in the passenger compartment, the anchorage system including a latchable bar member. The method also includes providing a child restraint installation system coupled to the anchorage system, the child restraint installation system including a sensor contact member including a sensor contact surface, a sensor configured to contact the sensor contact surface of the sensor contact member, and a retaining member including an opening configured to receive the sensor. The method also includes receiving, by the controller, a first signal from the child restraint installation system, determining, by the controller, from the signal, whether a first condition is satisfied, and in response to satisfaction of the first condition, generating, by the controller, a first notification signal.

In exemplary embodiments, the first condition is satisfied when the first signal received by the controller indicates a contact between the sensor and the sensor contact surface and the first notification signal indicates a connection between the sensor and the sensor contact surface.

In exemplary embodiments, the method further includes monitoring, by the controller, a contact between the sensor and the sensor contact surface and generating, by the controller, a second notification signal when the first signal indicates that the sensor has lost contact with the sensor contact surface.

In exemplary embodiments, the method further includes providing a presence sensor configured to determine a presence of a child in the child restraint and generating, by the controller, a third notification signal when data from the presence sensor indicates the presence of a child in the child restraint and the first signal indicates that the sensor has lost contact with the sensor contact surface.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the following description, the same or similar reference numbers refer to the same or similar features of the embodiments of the disclosure.

Figure 1:
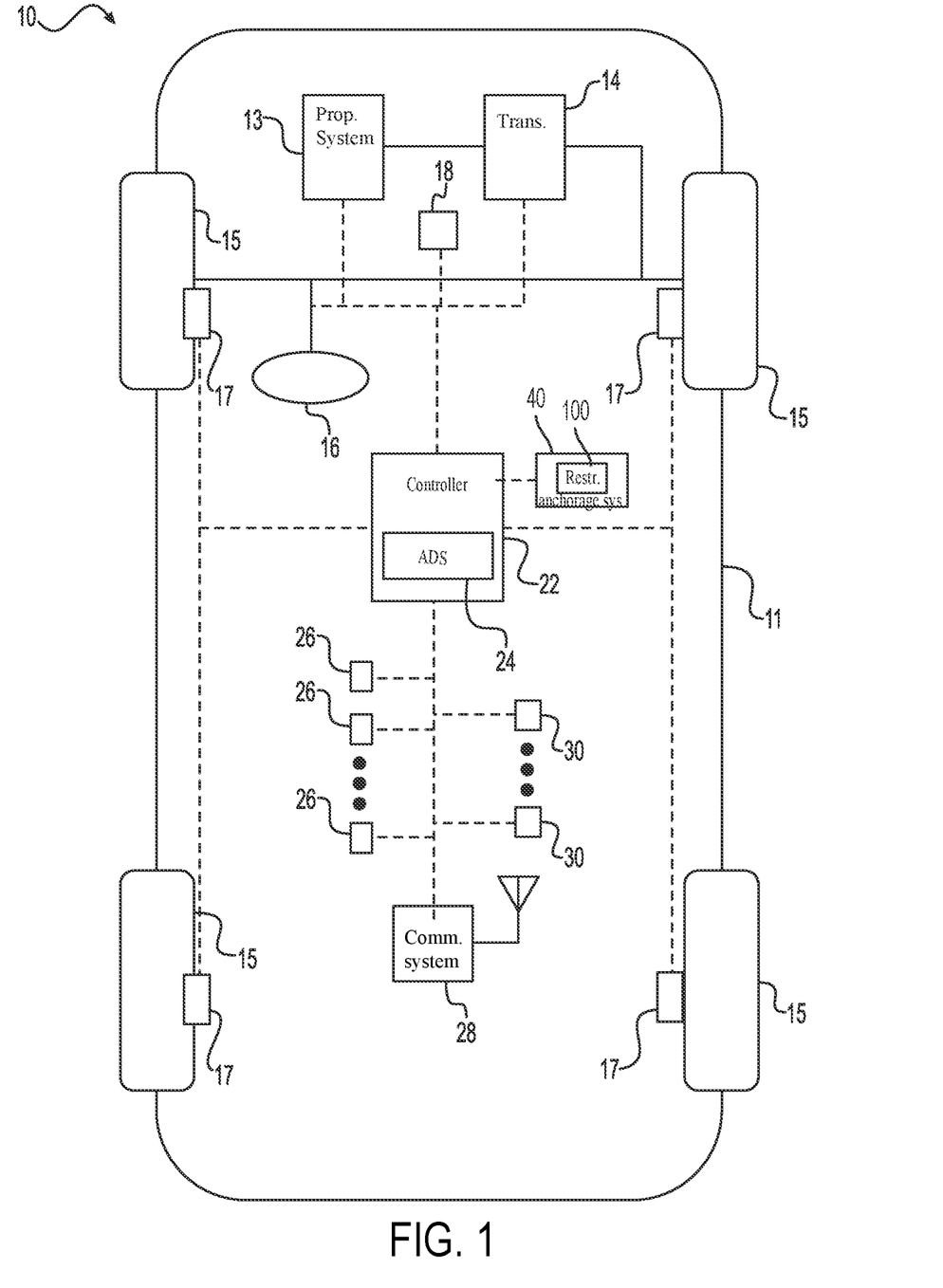
FIG. 1 is a schematic diagram of a vehicle, according to an embodiment of the present disclosure.

FIG. 1 schematically illustrates an automotive vehicle 10 according to the present disclosure. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. The vehicle 10 includes a propulsion system 13, which may in various embodiments include an internal combustion engine, an electric machine such as a traction motor, and/or a fuel cell propulsion system.

The vehicle 10 generally includes a body 11 and wheels 15. The body 11 encloses the other components of the vehicle 10 and also defines a passenger compartment. The wheels 15 are each rotationally coupled to the body 11 near a respective corner of the body 11.

The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously variable transmission, or other appropriate transmission.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 10 additionally includes an information system 18. In an exemplary embodiment, the information system 18 includes one or more means for conveying information to a vehicle operator or passenger, including visual, audible, or haptic feedback.

In various embodiments, the vehicle 10 also includes a navigation system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The vehicle 10 also includes an anchorage system 40 for securing a child restraint within a passenger compartment of the vehicle 10. In various embodiments, the anchorage system 40 is part of or coupled to a rear seat mounting location or may be affixed to the vehicle roof structure. In various embodiments, the anchorage system 40 is coupled to a child restraint installation system 100. In an exemplary embodiment, the child restraint installation system 100 is a system that detects whether a child restraint is properly installed with enough force to hold the child restraint in the proper position and provides various notifications to the vehicle operator or passenger on the status of the child restraint installation. As used herein, a child restraint includes a child car seat, booster seat, bucket seat, or any other means used to safely restrain a child in the passenger compartment of a vehicle.

The propulsion system 13, transmission 14, steering system 16, wheel brakes 17, information system 18, and child restraint installation system 100 of the anchorage system 40 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 via one or more brake control modules to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

Figure 2:
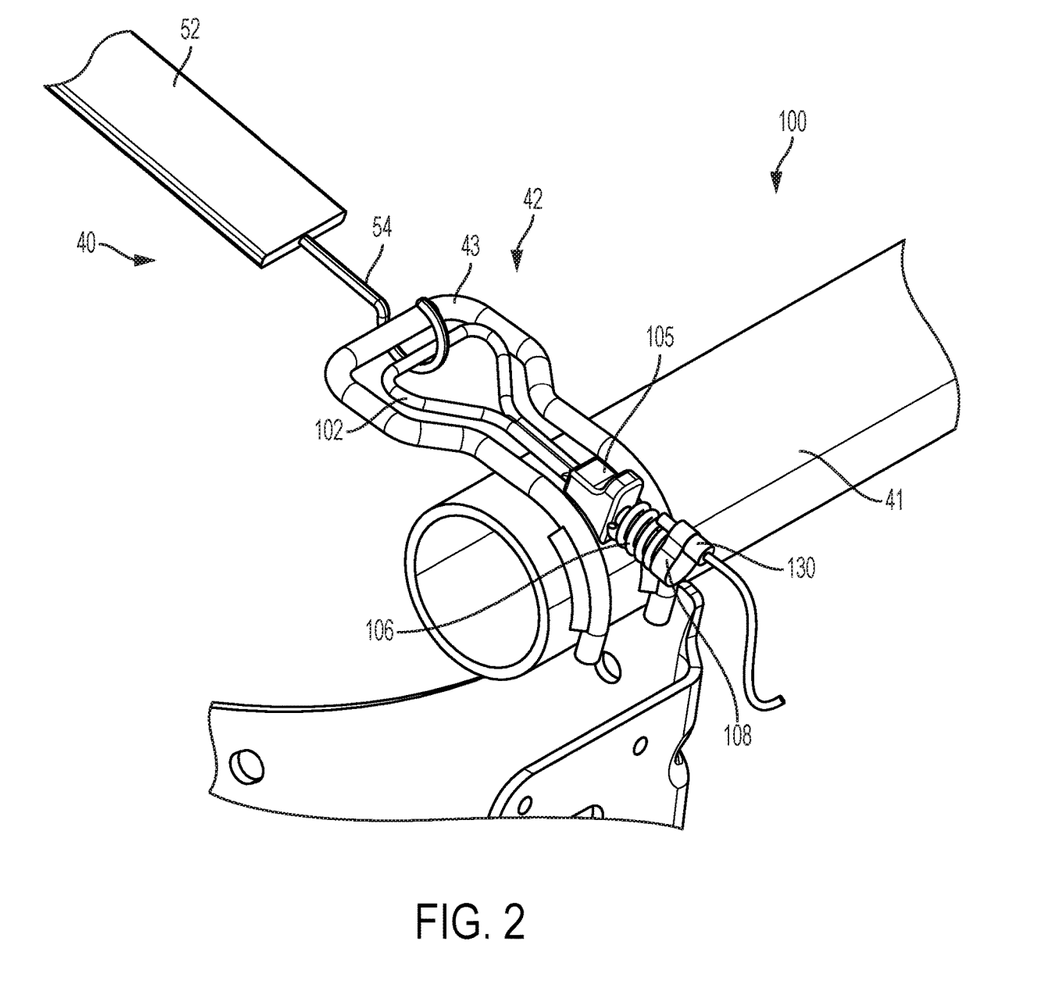
FIG. 2 is a schematic perspective diagram of a child restraint installation system, according to an embodiment of the present disclosure.

FIGS. 2, 3, 4A, and 4B illustrate an embodiment of the child restraint installation system 100 coupled to the anchorage system 40 for securing a child restraint on a vehicle seat. In the illustrated embodiment, the anchorage system 40 includes a latchable bar member 42 coupled to a rear seat belt mounting bar 41 of the vehicle 10, as shown in FIG. 2. The bar member 42 is a U-shaped anchor having a latchable portion 43 for releasable engagement with a corresponding child restraint latch mechanism, such as a strap 52 and hook 54, for example and without limitation. While the embodiments illustrated herein illustrate the latchable bar member 42 coupled to the rear seat belt mounting bar 41 of the vehicle, it is understood that in other embodiments the anchorage system 40 is a LATCH system located behind a vehicle seat in the form of a mounting bar or behind a seat as a wire hook.

In various embodiments, the installation system 100 includes a trigger member 102, a sensor contact member 105, a compression member 107, a retaining member 108, and a sensor 130.

Figure 3:
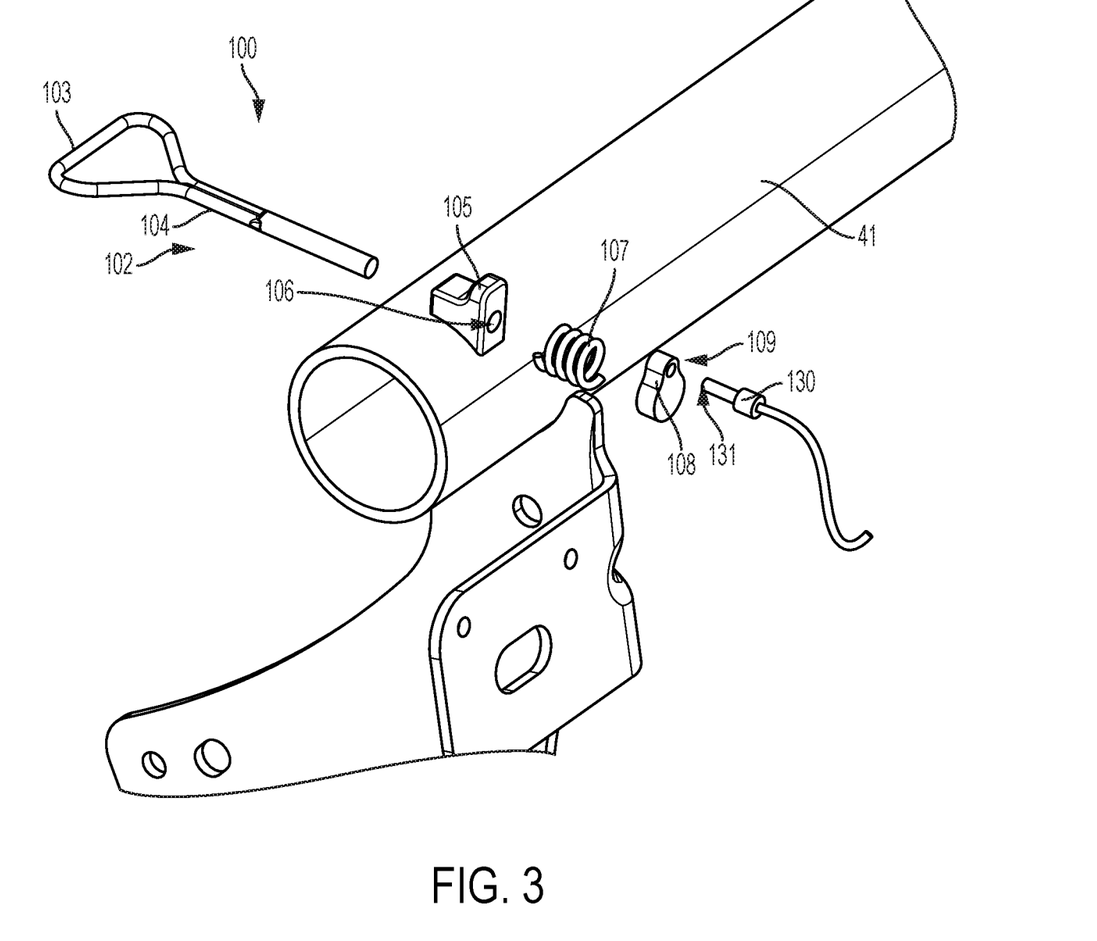
FIG. 3 is a schematic exploded perspective diagram of the child restraint installation system of FIG. 2.

As best illustrated in FIG. 3, the trigger member 102 has a "lollypop" shape with a trigger latch portion 103 forming a loop at a first end of the trigger member 102 and a straight portion 104 extending from a second end of the trigger member 102 opposite the first end. The trigger member 102 is configured to fit within the U-shaped anchor shape of the bar member 42 and releasably engage with the corresponding child restraint latch mechanism, such as the strap 52 and the hook 54, as shown in FIG. 2.

The sensor contact member 105 is coupled to the mounting bar 41 of the anchorage system 40. In various embodiments, the sensor contact member 105 is welded or mechanically coupled to the mounting bar 41. In various embodiments, the sensor contact member 105 is welded or coupled to a fixed component of the vehicle to which the child restraint is directly or indirectly coupled. The sensor contact member 105 includes an opening 106 configured to receive a portion of the trigger member 102 such that the sensor contact member 105 slidably engages with the trigger member 102. The straight portion 104 of the trigger member 102 extends through the opening 106 in the sensor contact member 105 such that the trigger member 102 translates relative to the sensor contact member 105, as discussed in greater detail herein. The sensor contact member 105 also includes a sensor contact surface 115, shown in FIG. 4A, configured to engage with the sensor 130.

The compression member 107, such as a spring, encircles at least a portion of the straight portion 104 of the trigger member 102. The retaining member 108 is coupled to a terminal end of the straight portion 104 of the trigger member 102 to retain the compression member 107 on the trigger member 102 between the retaining member 108 and the sensor contact member 105. The retaining member 108 translates with the trigger member 102 as the trigger member 102 moves relative to the sensor contact member 105.

The retaining member 108 includes an opening 109 configured to receive the sensor 130. At least a portion of the sensor 130 extends through the opening 109 such that a first terminal end 131 of the sensor 130 is on one side of the retaining member 108 and a second end of the sensor 130 opposite the first terminal end 131 is on the opposite side of the retaining member 108, as best shown in FIG. 2. In various embodiments, the sensor 130 is threaded into the opening 109 in the retaining member 108 such that the sensor 130 moves with the retaining member 108 as the trigger member 102 moves relative to the sensor contact member 105.

In various embodiments, the sensor 130 is a wired sensor coupled to the at least one controller 22. In other embodiments, the sensor 130 is a wireless sensor in communication with the at least one controller 22.

Figure 4A:
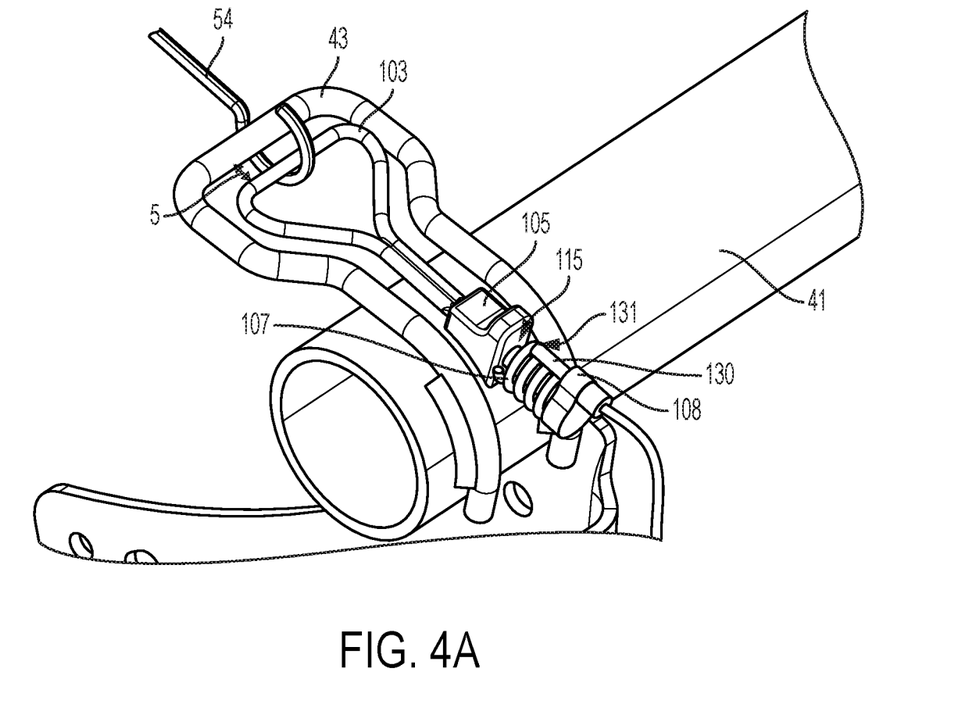
FIG. 4A is a schematic perspective diagram of the child restraint installation system of FIG. 2, shown in an unengaged position.
Figure 4B:
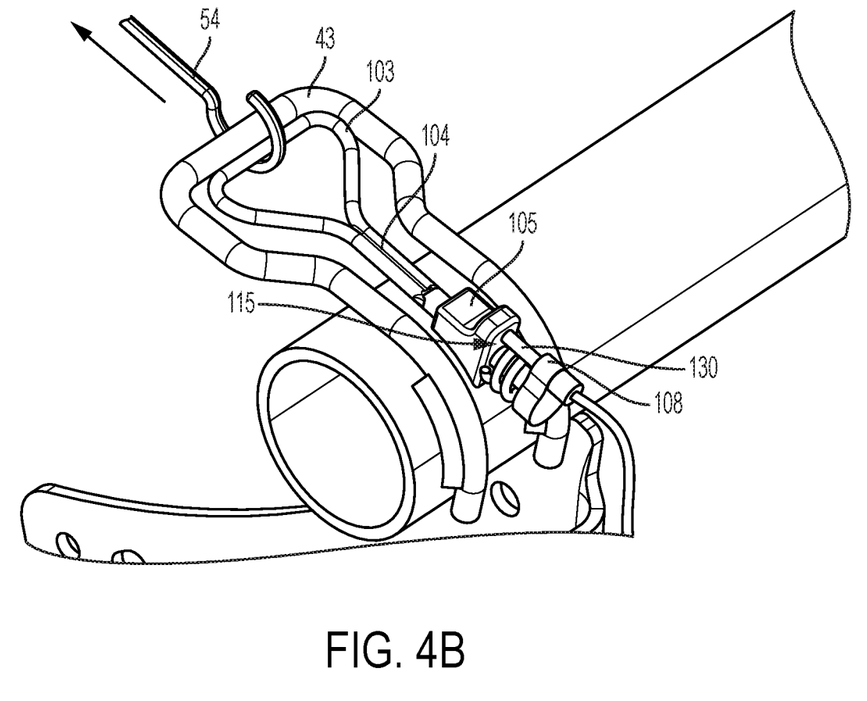
FIG. 4B is a schematic perspective diagram of the child restraint installation system of FIG. 2, shown in an engaged position.

With continued reference to FIGS. 4A and 4B, the trigger member 102 and the latchable bar member 42 releasably engage with the hook 54 of the corresponding child restraint latch mechanism. The hook 54 attaches to both the trigger latch portion 103 of the trigger member 102 and the latchable portion 43 of the latchable bar member 42. Applying pressure to the hook 54, as shown in FIG. 4B, that is, by pulling the strap 52 to the predetermined tightening force, pulls the trigger latch portion 103 toward the latchable portion 43 and reduces the distance 5 between the trigger latch portion 103 and the latchable portion 43. As the trigger latch portion 103 moves in the direction indicated by the arrow in FIG. 4B, the straight portion 104 of the trigger member 102 moves relative to the sensor contact member 105. Translation of the trigger member 102 also results in translation of the retaining member 108, resulting in compression of the compression member 107 to create tension in the installation system 100. The translation of the retaining member 108 also results in translation of the sensor 130 until the terminal end 131 of the sensor 130 contacts the sensor contact surface 115 of the sensor contact member 105.

Contact between the terminal end 131 of the sensor 130 and the sensor contact surface 115 triggers an electronic signal that is transmitted to the controller 22. The signal indicates that the child restraint has been properly installed and tensioned. The controller 22 receives the signal indicating contact between the sensor 130 and the sensor contact member 105, processes the signal, and generates a notification signal that is transmitted to the information system 18 of the vehicle 10 to notify the vehicle operator or passenger of a properly installed child car restraint.

Release of the hook 54 from the trigger latch portion 103 of the trigger member 102 and the latchable portion 43 of the latchable bar member 42 results in translation of the sensor 130 away from the sensor contact member 105 due to the spring effect of the compression member 107. A lack of contact between the terminal end 131 of the sensor 130 and the sensor contact surface 115 also triggers an electronic signal that is transmitted to the controller 22, in some embodiments. The controller 22 then generates a notification signal that is transmitted to the information system 18 to notify the vehicle operator or passenger of an improperly installed child car restraint or a malfunction in the anchorage system 40.

Figure 5:
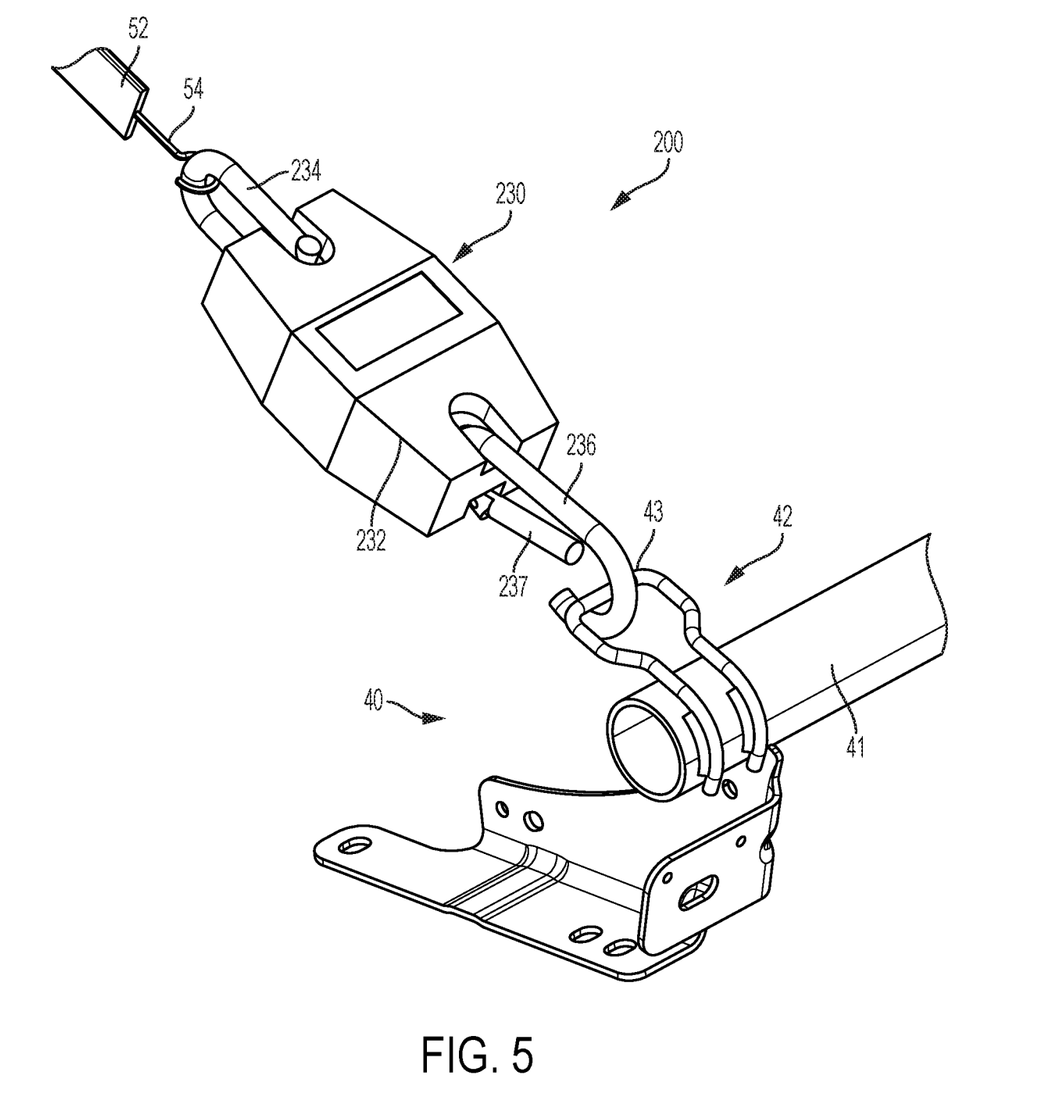
FIG. 5 is a schematic perspective diagram of a child restraint installation system, according to another embodiment of the present disclosure.

With reference to FIG. 5, a child restraint installation system 200 according to another embodiment of the present disclosure is illustrated. The installation system 200 interfaces with the anchorage system 40, as discussed herein, or with any other vehicle structures used to secure a child restraint in a vehicle. In various embodiments, the installation system 200 includes a sensor 230 coupled to the anchorage system 40.

In various embodiments, the sensor 230 is a weight sensor or load cell similar to a crane scale. The sensor 230 includes a sensor body 232, a first latching member 234, and a second latching member 236. The second latching member 236 includes a releasable portion 237 such that the sensor 230 is releasably secured to the latchable portion 43 of the latchable bar member 42. In various embodiments, the second latching member 236 is a carabiner-type thread lock style hook. The first latching member 234 is secured to the hook 54 of the child restraint latch mechanism such that the sensor 230 is between the child restraint latch mechanism and the anchorage system 40. In various embodiments, the sensor 230 is in communication with the at least one controller 22 via a wired or wireless connection. In various embodiments, the sensor 230 is configured to communicate directly with the information system 18 of the vehicle or with another mobile device, such as a mobile phone, tablet, etc.

As the operator tightens the strap 52 of the child restraint latch mechanism, the sensor 230 measures the load and, once a predetermined desired load is reached, transmits a signal to the controller 22. Similar to the child restraint installation system 100 discussed above, the controller 22 receives the signal indicating a desired load has been measured by the sensor 230, processes the signal, and generates a notification signal that is transmitted to the information system 18 of the vehicle 10 to notify the vehicle operator or passenger of a properly installed child car restraint. In various embodiments, if the sensor 230 measures a load that is less than the desired load, the controller 22 receives this sensor data, processes the data, and generates a notification signal that is transmitted to the information system 18 to notify the vehicle operator or passenger of an improperly installed child car restraint or a malfunction in the anchorage system 40.

Figure 6:
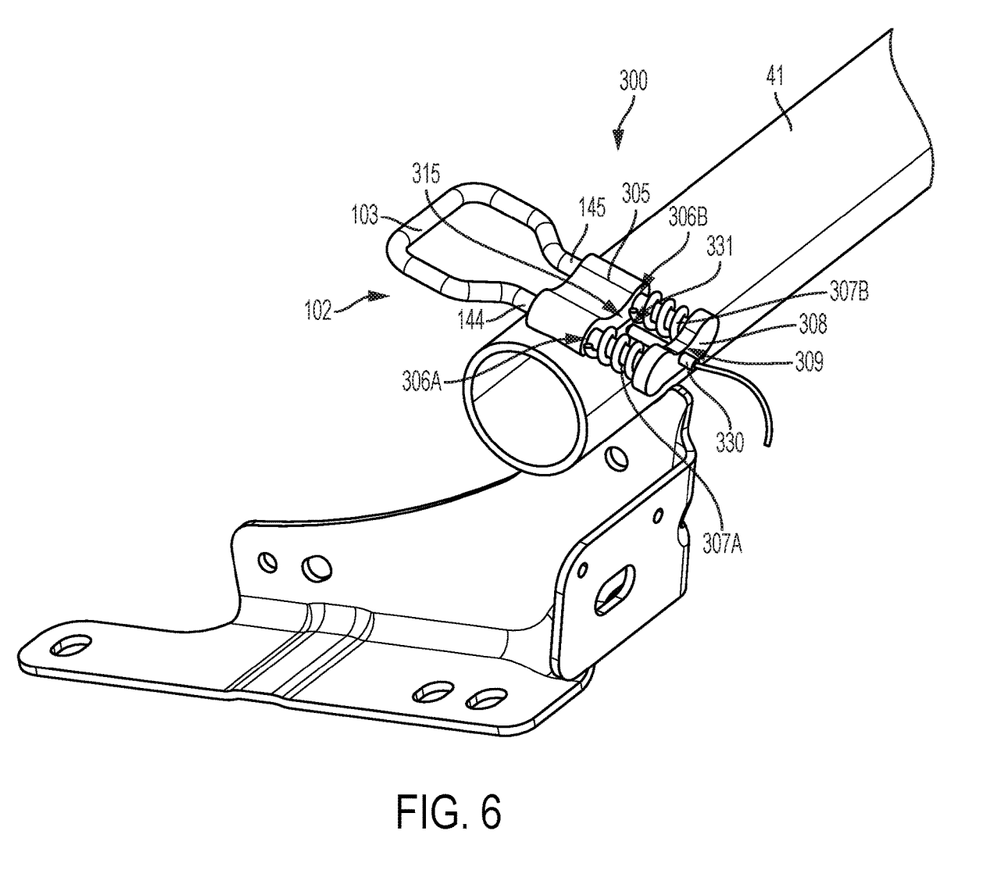
FIG. 6 is a schematic perspective diagram of a child restraint installation system, according to another embodiment of the present disclosure.

With reference now to FIG. 6, a child restraint installation system 300 according to another embodiment of the present disclosure is illustrated. The installation system 300 interfaces with the anchorage system 40, as discussed herein. In various embodiments, the installation system 300 includes a sensor contact member 305, first and second compression members 307A, 307B, a retaining member 308, and a sensor 330.

The sensor contact member 305 is coupled to the mounting bar 41 of the anchorage system 40. In various embodiments, the sensor contact member 305 is welded or mechanically coupled to the mounting bar 41. In various embodiments, the sensor contact member 305 is welded or coupled to a fixed component of the vehicle to which the child restraint is directly or indirectly coupled. The sensor contact member 305 includes a first opening 306A and a second opening 306B. The first and second openings 306A, 306B are configured to each receive a portion of the latchable bar member 42 such that the sensor contact member 305 slidably engages with the trigger member 102. A first leg 144 of the trigger member 102 extends through the first opening 306A in the sensor contact member 305 and a second leg 145 of the trigger member 102 extends through the second opening 306B in the sensor contact member 305 such that the trigger member 102 translates relative to the sensor contact member 305. The sensor contact member 305 also includes a sensor contact surface 315 configured to engage with the sensor 330.

The first compression member 307A, such as a spring, encircles at least a portion of the first leg 144 of the trigger member 102. The second compression member 307B, such as a spring, encircles at least a portion of the second leg 145 of the trigger member 102. The retaining member 308 is coupled to a terminal end of the first and second legs 144, 145 of the trigger member 102 to retain the compression members 307A, 307B on the trigger member 102. The retaining member 308 translates with the trigger member 102 as the trigger member 102 moves relative to the sensor contact member 305.

The retaining member 308 includes an opening 309 configured to receive the sensor 330. The sensor 330 extends through the opening 309 such that a first terminal end 331 of the sensor 330 is on one side of the retaining member 308 and a second end of the sensor 330 opposite the first terminal end 331 is on the opposite side of the retaining member 308. In various embodiments, the sensor 330 is threaded into the opening 309 in the retaining member 308 such that the sensor 330 moves with the retaining member 308 as the trigger member 102 moves relative to the sensor contact member 305.

In various embodiments, the sensor 330 is a wired sensor coupled to the at least one controller 22. In other embodiments, the sensor 330 is a wireless sensor in communication with the at least one controller 22.

While not shown in FIG. 6, the trigger member 102 releasably engages with the hook 54 of the corresponding child restraint latch mechanism. The hook 54 attaches to the trigger latch portion 103 of the trigger member 102 as shown in FIG. 2. Applying pressure to the hook 54 of the child restraint latch mechanism results in movement of the trigger member 102 relative to the mounting bar 41 and the sensor contact member 305. Translation of the trigger member 102 also results in translation of the retaining member 308, resulting in compression of the first and second compression members 307A, 307B to create tension in the installation system 300. The translation of the retaining member 308 also results in translation of the sensor 330 until the terminal end 331 of the sensor 330 contacts the sensor contact surface 315 of the sensor contact member 305.

Contact between the terminal end 331 of the sensor 330 and the sensor contact surface 315 triggers an electronic signal that is transmitted to the controller 22. The signal indicates that the child car restraint has been properly installed and tensioned. The controller 22 receives the signal indicating contact between the sensor 330 and the sensor contact member 305, processes the signal, and generates a notification signal that is transmitted to the information system 18 of the vehicle 10 to notify the vehicle operator or passenger of a properly installed child car restraint. In some embodiments, contact between the sensor 330 and the sensor contact member 305 triggers illumination of a light source, such as an LED, located near the point of installation of the child restraint installation system 300.

Release of the hook 54 from the trigger latch portion 103 of the trigger member 102 results in translation of the terminal end 331 of the sensor 330 away from the sensor contact member 305 due to the spring effect of the first and second compression members 307A, 307B. A lack of contact between the terminal end 331 of the sensor 330 and the sensor contact surface 315 also triggers an electronic signal that is transmitted to the controller 22, in some embodiments. In various embodiments, the controller 22 then generates a notification signal that is transmitted to the information system 18 to notify the vehicle operator or passenger of an improperly installed child car restraint or a malfunction in the anchorage system 40. In some embodiments, lack of contact between the terminal end 331 of the sensor 330 and the sensor contact surface 315 triggers illumination of a light source, such as an LED, located near the point of installation of the child restraint installation system 300.

Figure 7:
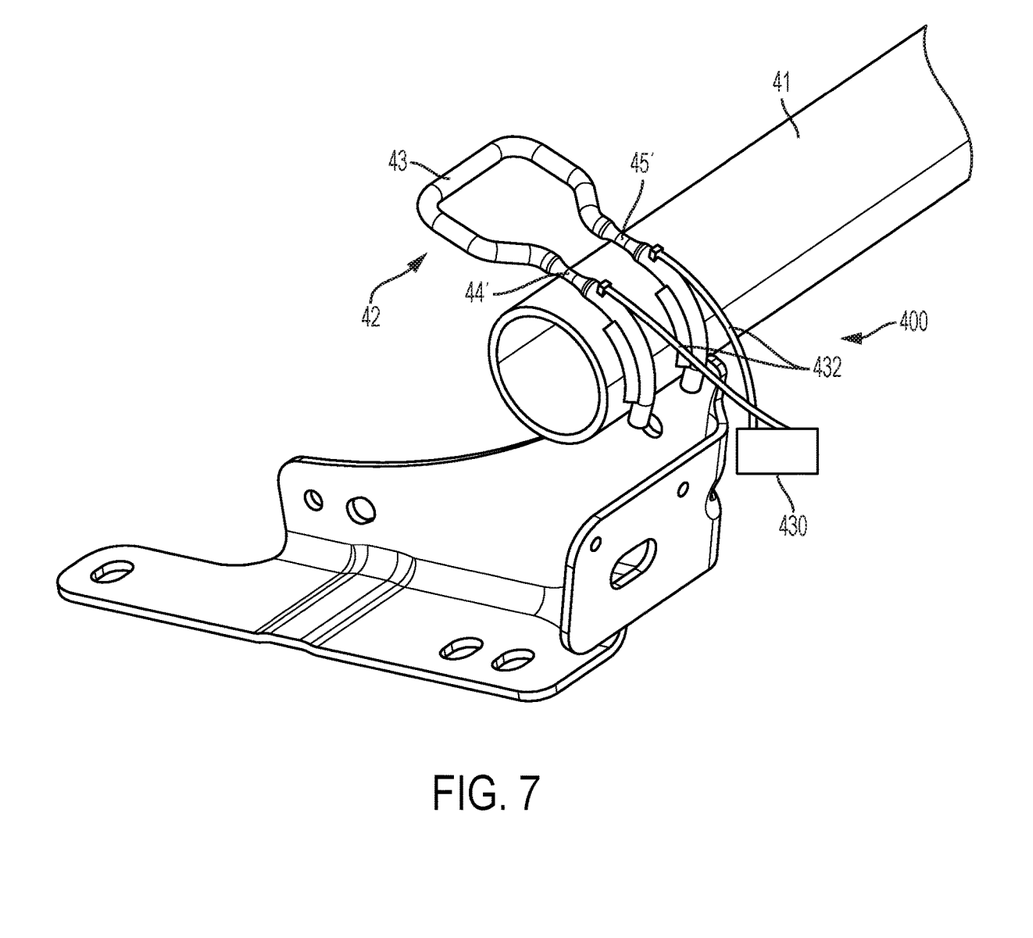
FIG. 7 is a schematic perspective diagram of a child restraint installation system, according to another embodiment of the present disclosure.

FIG. 7 illustrates a child restraint installation system 400 according to another embodiment of the present disclosure. The installation system 400 interfaces with the anchorage system 40, as discussed herein, or with any fixed component of the vehicle to which the child restraint is directly or indirectly coupled. In various embodiments, the installation system 400 includes a sensor 430 directly connected to the latchable bar member 42.

Similar to the anchorage systems 40 discussed herein, the anchorage system 40 shown in FIG. 7 includes a latchable bar member 42. The latchable bar member 42 includes a latchable portion 43 that interfaces with the child restraint latch mechanism as discussed with reference to FIG. 2. The latchable bar member 42 includes a first leg 44' and a second leg 45'. The first leg 44' has a smaller diameter than the latchable portion 43. Similarly, the second leg 45' has a smaller diameter than the latchable portion 43.

The sensor 430 is connected to the first and second legs 44', 45' by conducting members 432. In various embodiments, the conducting members 432 are electrically conductive wires that may be wrapped or covered by an insulating material. An electric current is passed through the conducting members 432 from the sensor 430 to the first and second legs 44', 45', creating a circuit loop. As the child restraint latch mechanism exerts force on the latchable bar member 42 during the tightening step of the installation, the resistance in the circuit loop changes. The sensor 430 measures this change in resistance and triggers an electronic signal that is transmitted to the controller 22. The signal indicates that the child car restraint has been properly installed and tensioned. The controller 22 receives the signal, processes the signal, and generates a notification signal that is transmitted to the information system 18 of the vehicle 10 to notify the vehicle operator or passenger of a properly installed child car restraint.

In various embodiments, any of the child restraint installation systems discussed herein are in communication with the at least one controller 22 via a wired or wireless connection. In various embodiments, any of the child restraint installation systems include a wireless communication mechanism, such as Bluetooth™ that can directly communicate with the information system 18 of the vehicle 10 or with any other Bluetooth™ equipped device. In various embodiments, any of the child restraint installation systems communicate directly with a mobile device, such as a phone, tablet, laptop, etc. to provide notification directly to the phone, tablet, laptop, etc. In various embodiments, any of the child restraint installation systems include a passenger presence sensor which, together with the child restraint installation systems discussed herein can identify if there is a child in the child restraint and if the child restraint is securely attached to the anchorage system of the vehicle and provide notification of these and other conditions while the vehicle is moving, idling, and/or stopped.

Various LATCH or anchorage systems may be located at different positions within the vehicle 10, in some embodiments. Some systems may be positioned behind the seat in the form of a bar or behind the seat of a pick-up truck as a wire hook. While the embodiments of the installation system discussed herein are depicted as coupled to a rear seat belt mounting bar, it is understood that any of the installation systems discussed herein may be coupled to any anchorage systems for a child restraint to detect the correct installation of the restraint and trigger a notification if an incorrect installation is detected or provide feedback regarding a correct installation.

Figure 8:
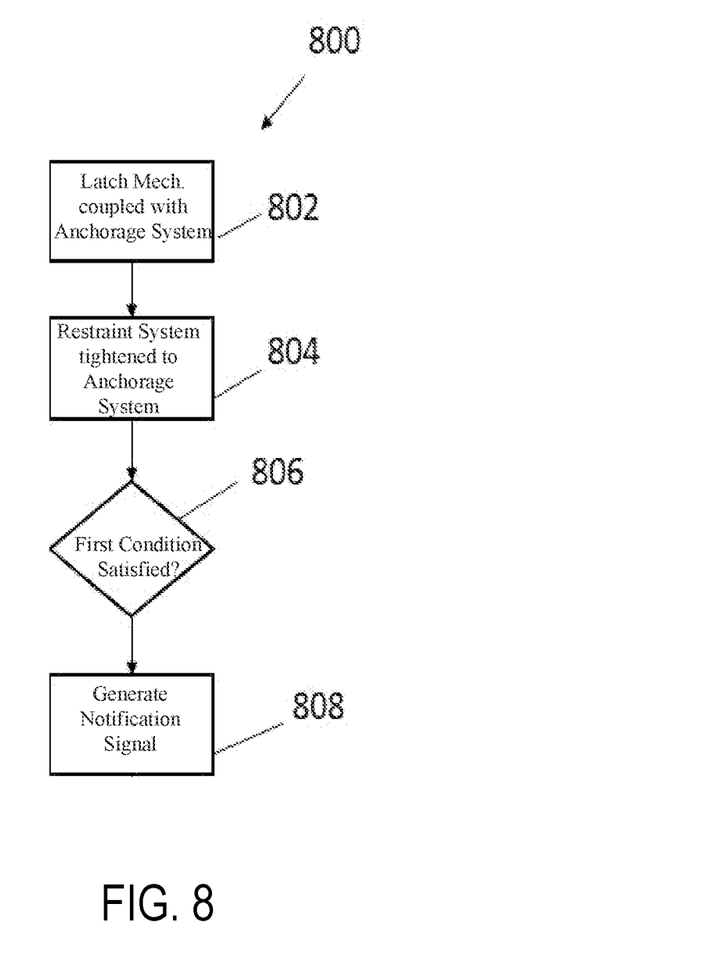
FIG. 8 is a flowchart representation of a method to detect an installation condition of a child restraint, according to an embodiment of the present disclosure.

FIG. 8 illustrates a method 800 to detect an installation condition of a child restraint, according to an embodiment of the present disclosure. The method 800 can be utilized in connection with any of the installation systems discussed herein. The method 800 can be utilized in connection with the controller 22 as discussed herein, or by other systems associated with or separate from the vehicle, in accordance with exemplary embodiments. The order of operation of the method 800 is not limited to the sequential execution as illustrated in FIG. 8, but may be performed in one or more varying orders, or steps may be performed simultaneously, as applicable in accordance with the present disclosure.

Beginning at 802, the child restraint latch mechanism is coupled with the anchorage system 40 of the vehicle 10. The anchorage system 40 includes or is coupled with one of the embodiments of the child restraint installation systems discussed herein. As discussed herein, the anchorage system 40 may be positioned behind the seat in the form of a bar or behind the seat of a pick-up truck as a wire hook.

Next, at 804, the child restraint installation system is tightened to the anchorage system. In various embodiments, such as the embodiment shown in FIGS. 4A and 4B, the strap 52 is pulled until a predetermined tension is achieved and the sensor touches the sensor contact surface. At 804, the controller receives one or more signals from the installation system regarding the status of the installation system and monitors the signals.

At 806, the controller determines whether a first condition is satisfied. In various embodiments, the first condition is satisfied if there has been any change in the sensor contact, that is, that the sensor has gained or lost contact with the sensor contact surface. In various embodiments, the first condition is whether a presence sensor detects a child in the child restraint. In various embodiments, at 806, the controller determines both whether there is a change in the sensor contact and whether a presence sensor detects a child in the child restraint.

If the first condition is satisfied, that is, when the controller determines that there has been a change in the sensor contact, the method 800 proceeds to 808 and the controller generates a first notification signal that is transmitted to the information system 18 of the vehicle 10 to notify the vehicle operator or passenger of a properly installed child car restraint if the sensor data indicates that the sensor is in contact with the sensor contact surface or generates a second notification signal to notify the vehicle operator or passenger of an improperly installed child restraint if the sensor data indicates that the sensor has lost contact or is not in contact with the sensor contact surface. Additionally, at 808, if the vehicle 10 includes a presence sensor in communication with the controller, the controller generates a third notification signal if the presence sensor data indicates that a child is detected in the child restraint.

If the first condition is not satisfied, the controller continues to monitor the status of the sensor(s) of the vehicle 10 at 804. In various embodiments, the controller continues to monitor the status of the sensor(s), including contact between the sensor and the sensor contact member of the installation system, while the vehicle is at idle and while the vehicle is in motion.

In various embodiments, the method 800 includes generating notification signals depending on the vehicle operating status, such as notifying the driver of the vehicle when the vehicle is at idle or stopped and not notifying the driver when the vehicle is moving.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
a body having a passenger compartment;
an anchorage system for securing a child restraint disposed in the passenger compartment, the anchorage system including a latchable bar member having a U-shaped latchable portion;
a child restraint installation system coupled to the anchorage system, the child restraint installation system including a trigger member having a trigger latch portion forming a loop at a first end of the trigger member, a sensor contact member coupled to the anchorage system, a retaining member coupled to the trigger member, and a sensor coupled to the retaining member and movable relative to the sensor contact member, wherein the trigger member is movable relative to the sensor contact member;
a child restraint latch mechanism coupled to the child restraint disposed in the passenger compartment, the child restraint latch mechanism including a hook coupled to a tensionable strap; and
at least one controller in communication with the sensor, the at least one controller being configured to, in response to satisfaction of a first operating condition, generate a first notification signal and, in response to satisfaction of a second operating condition, generate a second notification signal;
wherein the loop of the trigger latch portion fits within the U-shaped latchable portion of the latchable bar member and the trigger latch portion and the latchable portion of the latchable bar member releasably engage with the hook of the child restraint latch mechanism such that a force applied to the hook pulls the trigger latch portion toward the latchable portion.

2. The automotive vehicle of claim 1, wherein the sensor contact member includes an opening configured to receive a portion of the trigger member such that the trigger member slidably engages with the sensor contact member.

3. The automotive vehicle of claim 2, wherein the sensor contact member includes a sensor contact surface configured to engage with the sensor.

4. The automotive vehicle of claim 3 wherein the child restraint installation system further comprises a compression member, wherein the retaining member is coupled to a terminal end of the trigger member, and the compression member encircles a portion of the trigger member and is disposed between the retaining member and the sensor contact member.

5. The automotive vehicle of claim 4, wherein the retaining member includes an opening configured to receive the sensor, the sensor is configured to move with the retaining member relative to the sensor contact member such that a terminal end of the sensor is in contact with the sensor contact surface under the first operating condition and the terminal end of the sensor is not in contact with the sensor contact surface under the second operating condition.

6. The automotive vehicle of claim 1, wherein the anchorage system includes a rear seat belt mounting bar and the latchable bar member and the sensor contact member are coupled to the rear seat belt mounting bar.

7. The automotive vehicle of claim 1, wherein the child restraint installation system further includes a light source configured to illuminate in response to satisfaction of either or both of the first and second operating conditions.

8. The automotive vehicle of claim 1 further comprising an information system in communication with the at least one controller and the information system is configured to convey information to a vehicle passenger regarding one or both of the first and second operating conditions.

9. A method to improve child restraint installation detection, the method comprising:
   providing an automotive vehicle having a body enclosing a passenger compartment and a controller, the passenger compartment including an anchorage system for securing a child restraint disposed in the passenger compartment, the anchorage system including a latchable bar member having a U-shaped latchable portion;
   providing a child restraint installation system coupled to the anchorage system, the child restraint installation system including a trigger member having a trigger latch portion forming a loop at a first end of the trigger member such that the loop of the trigger latch portion fits within the U-shaped latchable portion of the latchable bar member; a sensor contact member coupled to the anchorage system, the sensor contact member including a sensor contact surface; a sensor configured to contact the sensor contact surface of the sensor contact member, the sensor being coupled to the retaining member and movable relative to the sensor contact member, wherein the trigger member is movable relative to the sensor contact member; and a retaining member coupled to the trigger member and including an opening configured to receive the sensor;
   providing a child restraint latch mechanism coupled to the child restraint disposed in the passenger compartment the child restraint latch mechanism including a hook coupled to a tensionable strap;
   wherein the trigger latch portion and the latchable portion of the latchable bar member releasably engage with the hook of the child restraint latch mechanism such that a force applied to the hook pulls the trigger latch portion toward the latchable portion;
   receiving, by the controller, a first signal from the child restraint installation system;
   determining, by the controller, from the first signal, whether a first operating condition is satisfied; and
   in response to satisfaction of the first operating condition, generating, by the controller, a first notification signal and,
   in response to satisfaction of a second operating condition, generating, by the controller, a second notification signal.

10. The method of claim 9, wherein the first condition is satisfied when the first signal received by the controller indicates a contact between the sensor and the sensor contact surface and the first notification signal indicates a connection between the sensor and the sensor contact surface.

11. The method of claim 10 further comprising monitoring, by the controller, a contact between the sensor and the sensor contact surface and generating, by the controller, a second notification signal when the first signal indicates that the sensor has lost contact with the sensor contact surface.

12. The method of claim 11 further comprising providing a presence sensor configured to determine a presence of a child in the child restraint and generating, by the controller, a third notification signal when data from the presence sensor indicates the presence of a child in the child restraint and the first signal indicates that the sensor has lost contact with the sensor contact surface.

* * * * *